United States Patent
Daio

(10) Patent No.: US 7,741,811 B2
(45) Date of Patent: Jun. 22, 2010

(54) CAPACITOR CHARGING CONTROL CIRCUIT

(75) Inventor: Mitsuaki Daio, Yasu (JP)

(73) Assignee: OMRON Corporation, Kyoto (JP)

( * ) Notice: Subject to any disclaimer, the term of this patent is extended or adjusted under 35 U.S.C. 154(b) by 249 days.

(21) Appl. No.: 12/015,307

(22) Filed: Jan. 16, 2008

(65) Prior Publication Data

US 2008/0169791 A1    Jul. 17, 2008

(30) Foreign Application Priority Data

Jan. 17, 2007    (JP)    ............... 2007-008517

(51) Int. Cl.
*H02J 7/00* (2006.01)
(52) U.S. Cl. ............... 320/122; 320/118; 320/166
(58) Field of Classification Search ........... 320/166, 320/122
See application file for complete search history.

(56) References Cited

U.S. PATENT DOCUMENTS

| | | | | |
|---|---|---|---|---|
| 5,969,505 | A * | 10/1999 | Okamura | ............... 320/122 |
| 6,075,378 | A * | 6/2000 | Okamura | ............... 324/771 |
| 6,133,710 | A * | 10/2000 | Okamura | ............... 320/122 |
| 7,078,914 | B2 * | 7/2006 | Yano et al. | ............... 324/658 |
| 7,248,020 | B2 * | 7/2007 | Hidaka et al. | ............... 320/134 |
| 7,508,165 | B2 * | 3/2009 | Sobue et al. | ............... 320/118 |
| 7,564,217 | B2 * | 7/2009 | Tanigawa et al. | ............... 320/118 |

FOREIGN PATENT DOCUMENTS

JP    3313647 B2    5/2002
JP    2005-287155 A    10/2005

OTHER PUBLICATIONS

English abstract of JP2000050495 published Feb. 18, 2000, esp@cenet database, 1 page.
English abstract of JP2005287155 published Oct. 13, 2005, esp@cenet database, 1 page.

* cited by examiner

*Primary Examiner*—Edward Tso
*Assistant Examiner*—Ramy Ramadan
(74) *Attorney, Agent, or Firm*—Osha • Liang LLP

(57) ABSTRACT

A parallel monitor circuit having a simple circuit configuration, in which a voltage divider circuit can be formed with resistors having the same resistance value, includes plural capacitors are connected in series, and a bypass device of each of parallel monitor circuits is connected in parallel with each capacitor. Plural voltages Va different from one another by a constant voltage are sequentially outputted from a digital-to-analog converter, and the voltages Va are inputted to plural parallel monitor circuits. When a charging voltage is higher than a monitor voltage determined by the voltage Va, each capacitor discharges through the bypass device, and the capacitor is kept at a predetermined monitor voltage.

8 Claims, 6 Drawing Sheets

Resistor R

Bias voltage △VR

CAPACITOR CHARGING CONTROL CIRCUIT

BACKGROUND OF THE INVENTION

1. Field of the Invention

The present invention relates to a capacitor charging control circuit which evenly charges plural series-connected capacitors.

2. Description of the Related Art

An electrical double layer capacitor can rapidly charged, while it takes a long time to charge a secondary battery. Additionally, the electrical double layer capacitor has the feature not shared by the secondary battery. That is, a large amount of energy can be stored (high energy density) in the electrical double layer capacitor. However, because the electrical double layer capacitor has a low rated voltage of about 3.0V, usually the plural electrical double layer capacitors are connected in series to ensure a large voltage.

In charging the large-capacity capacitor in which the plural electrical double layer capacitors are connected in series, uneven charging voltages are generated in the capacitors due to a difference in capacity among the electrical double layer capacitors, self-charging, and self-discharge.

Usually a charging uniformizing circuit called a parallel monitor circuit is used as the measure against the uneven charging voltages. For example, in a capacitor charging monitor and control apparatus disclosed in Japanese Patent No 3313647, parallel monitor circuits are provided in series-connected electrical double layer capacitors respectively, a charging current of the electrical double layer capacitor is bypassed by a bypass transistor of the parallel monitor circuit when a voltage at the electrical double layer capacitor (voltage between both ends of the electrical double layer capacitor) reaches a predetermined monitor voltage, whereby the voltage at the electrical double layer capacitor is maintained at a predetermined monitor voltage value. In the beginning of the charging, initialization is performed by tentatively uniformizing the voltages at the electrical double layer capacitors to the monitor voltage, and the electrical double layer capacitors are fully charged after the voltages at the electrical double layer capacitors are uniformized to the predetermined monitor voltage, whereby a variation in charging is reduced during in fully charging the capacitors.

However, in the parallel monitor circuit disclosed in Japanese Patent No. 3313647, control cannot finely be performed according to various conditions due to the one monitor voltage during the initialization. Therefore, there is the large variation in the charged state of the capacitors, when fully charging is detected to stop the charging.

Therefore, in a parallel monitor circuit disclosed in Japanese patent Publication Laid-Open No. 2005-287155, the monitor voltages are set in plural stages, the monitor voltages of the electrical double layer capacitors are uniformized by charging the electrical double layer capacitors to a larger monitor voltage when the voltages of the electrical double layer capacitors are uniformized to a certain monitor voltage, and the electrical double layer capacitors are charged up to the fully charging voltage while the voltages of the electrical double layer capacitors are gradually uniformized to a larger monitor voltage.

FIG. 1 is a circuit diagram showing a monitor voltage producing circuit disclosed in Japanese patent Publication Laid-Open No. 2005-287155. In the monitor voltage producing circuit, bypass transistors Q1, Q2, . . . whose emitters are connected to resistors R1, R2, . . . are connected to electrical double layer capacitors (hereinafter simply referred to as capacitor) C1, C2, . . . in parallel, and a power supply Vdd is connected to the capacitor C1. Portion surrounded by broken lines constitute parallel monitor circuits PM1, PM2, . . . of the capacitors C1, C2, . . . . Because the parallel monitor circuits PM1, PM2, . . . have the same configuration, the parallel monitor circuit PM1 will be described below.

The parallel monitor circuit PM1 includes a voltage setting circuit VS1, a comparator CMP11, a comparator CMP12, a reference voltage Vr1, an output control circuit OC1, and a bypass drive transistor M1. Terminals Cell1 and Cell2 are connected to both ends of the capacitor C1, and a terminal Out1 is connected to a base of the bypass transistor Q1.

The voltage between both ends of the capacitor C1 (hereinafter referred to as capacitor voltage) is applied to both ends of the voltage setting circuit VS1, and an output VSo1 of the voltage setting circuit VS1 outputs the voltage proportional to the capacitor voltage, and a proportional constant is set by a control circuit (not shown).

The comparator CMP12 compares the output VSo1 of the voltage setting circuit VS1 and the reference voltage Vr1, and the comparator CMP12 outputs a high level when the output VSo1 becomes larger than the reference voltage Vr1. Therefore, when the capacitor C1 is charged to increase the capacitor voltage, the output VSo1 is increased with increasing capacitor voltage, and the output VSo1 reaches the reference voltage Vr1 when the capacitor voltage reaches a certain value. When the output VSo1 becomes the reference voltage Vr1, the output of the comparator CMP12 is switched to the high level to turn on the bypass drive transistor M1 (output control circuit OC1 is brought into conduction when ENIN1 is active). When the bypass drive transistor M1 is turned on, the bypass transistor Q1 is turned on to discharge the capacitor C1, and the capacitor voltage is maintained at a certain value.

The comparator CMP11 monitors low voltage caused by over discharge of the capacitor C1, and the comparator CMP11 stops the discharge of the capacitor C1 when the low voltage is generated.

FIG. 2 is a circuit diagram showing a configuration of the voltage setting circuit VS1. A decoder DeC sets one of outputs OUT1 to OUT16 to the high level according to 4-bit inputs RC1a to RC1d (RC1 of FIG. 1) while setting other output to the low level. Outputs OUT1B to OUT16B have opposite levels to the outputs OUT1 to OUT16 respectively. Voltage dividing resistors r0, r1, . . . , and r18 are connected in series, and an upper end of the resistor r0 is connected to a terminal Cell1, and a lower end of the resistor r18 is connected to a terminal Cell2 through NMOS transistor M1a. The voltage between the terminals Cell1 and Cell2 is the voltage at the capacitor C1.

In analog switches (formed by NMOS transistors and PMOS transistors) ASW1 to ASW15, control terminals ASG are connected to outputs OUT1 to OUT15 of the decoder DeC and control terminals ASGB are connected to outputs OUT1B to OUT15B of the decoder DeC respectively. Terminals IN of the analog switches ASW1 to ASW15 are connected to a midpoint between the resistors r0 and r1, and terminals OUT are connected to a midpoint between the resistors r1 and r2, a midpoint between the resistors r2 and r3, . . . , and a midpoint between the resistors r15 and r16. In the analog switch ASW1 to ASW15, when the control terminal ASG is set to the high level while the control terminal ASGB is set to the low level, the terminals IN-OUT are brought in conduction to short-circuit the resistors r1, r1 and r2, . . . , r1 to r15.

Assuming that the fully charging voltage of the capacitor C1 is set to 2.7V, the voltage setting circuit VS1 changes the monitor voltage of the capacitor C1 from 1.3V to 2.7V in 0.1V increment according to the values of the inputs RC1$a$ to RC1$d$. That is, the monitor voltage becomes 1.3V when the analog switch ASW1 is turned on, the monitor voltage becomes 1.4V when the analog switch ASW2 is turned on, the monitor voltage is increased by 0.1V by sequentially switching the turn-on of the analog switches ASW3 to ASW14, and the monitor voltage becomes the fully charging voltage of 2.7V when the analog switch ASW15 is turned on.

Because absolute accuracy is required for the monitor voltage of the capacitor C1, the monitor voltage can be changed by trimming a fuse element F1 connected in parallel with the resistor r16. An inverter INV1, an analog switch ASW16, and a resistor r17 perform hysteresis operation of the comparator CMP12.

In the monitor voltage producing circuit, in starting the charging, the analog switches ASW1 of the parallel monitor circuits PM1, PM2, . . . are turned on, and the monitor voltage is set to 1.3V to charge the capacitors C1, C2, . . . . Because the bypass transistor is turned on to perform the discharge in the capacitor which reaches 1.3V, the capacitor is maintained at the monitor voltage of 1.3V. When the control circuit detects that the capacitor voltages of all the capacitors C1, C2, . . . reach 1.3V, the control circuit changes the voltage of the inputs RC1$a$ to RC1$d$ to turn on the analog switches ASW2 of the parallel monitor circuits PM1, PM2, . . . , and the control circuit sets the monitor voltage to 1.4V to charge the capacitors C1, C2, . . . . Because the bypass transistor is turned on to perform the discharge in the capacitor which reaches 1.4, the capacitor is maintained at the monitor voltage of 1.4V. When the control circuit detects that the capacitor voltages of all the capacitors C1, C2, . . . reach 1.4V, the control circuit increases the monitor voltage to 1.5V. Thus, the capacitor voltage is boosted up to the fully charging voltage of 2.7V in 0.1V increment while the capacitor voltage of the plural capacitors C1, C2, . . . are uniformized so as to become the same monitor voltage. Therefore, according to the monitor voltage producing circuit, the charging levels of the plural capacitors C1, C2, . . . can be uniformized when the charging is completed.

Because the capacitor voltage is sequentially boosted while the charging voltages of the electrical double layer capacitors are uniformized, it is necessary that the monitor voltages be boosted at equal intervals. However, in the monitor voltage producing circuit disclosed in Japanese patent Publication Laid-Open No. 2005-287155, because the monitor voltage is adjusted on a voltage divider side, the voltage dividing resistors r0 to r15 cannot be uniformized to the same resistance value, but the resistors r0 to r15 have the different resistance values. In order to enhance relative pair accuracy of the resistors in a semiconductor integrated circuit, it is necessary to uniformized shapes, widths, and lengths of the resistors. However, because the resistors r0 to r15 have the different resistance values, unfortunately a variation in accuracy of the resistance value is increased to hardly obtain the accurate monitor voltage.

Additionally, in the monitor voltage producing circuit disclosed in Japanese patent Publication Laid-Open No. 2005-287155, it takes a lot of trouble with resistor production because the voltage dividing resistors r0 to r18 are required in each parallel monitor circuit, and it is difficult to produce the resistor because the resistance values are uniformized among the parallel monitor circuits. Therefore, in the structure disclosed in Japanese patent Publication Laid-Open No. 2005-287155, a yield of the monitor voltage producing circuit or parallel monitor circuit is decreased.

A paragraph No. 0025 of Japanese patent Publication Laid-Open No. 2005-287155 describes that "when the resistance values of the resistors r1 to r15 are set to the same resistance value, the difference in voltage between the adjacent monitor voltages set by turning on and off the analog switches ASW1 to ASW15 can be uniformized. For example, the monitor voltage can be set from 1.3V to 2.7V in 0.1V increment." However, the voltage setting circuit is configured such that the resistors r1 to r$n$ (n=1 to 15) are short-circuited by the analog switches ASW1 to ASW15, the monitor voltages are not changed at equal intervals when the resistance values of the resistors r1 to r15 are equalized, and the resistance values of the resistors r1 to r15 differ from one another when the monitor voltages are changed at equal intervals (for example, 0.4V increment). That is, assuming that the monitor voltages are set to Vm1, Vm2, . . . , and Vm15 in the ascending order, Vm1, Vm2, . . . , and Vm15 are expressed as follows:

$$Vm1 = [1 + r0/(r2 + r3 + \ldots + r18)]Vr1$$

$$Vm2 = [1 + r0/(r3 + r4 + \ldots + r18)]Vr1$$

$$\ldots$$

$$Vm15 = [1 + r0/(r16 + r17 + r18)]Vr1$$

In order to change the monitor voltages at equal intervals, it is necessary to satisfy the following equation:

$$r2/[(r3 + r4 + \ldots + r18)(r2 + r3 + \ldots + r18)] =$$
$$r3/[(r4 + r5 + \ldots + r18)(r3 + r4 + \ldots + r18)] \ldots =$$
$$r15/[(r16 + r17 + r18)(r15 + r16 + r17 + r18)]$$

The resistors r1 to r15 do not have the same value, but have unique values.

In the monitor voltage producing circuit disclosed in Japanese patent Publication Laid-Open No. 2005-287155, because the plural analog switches ASW1 to ASW16 are required in each parallel monitor circuit, the analog switches of the number of parallel monitor circuits×the number of output bits of the decoder are required as a whole, and it is necessary to produce the large number of analog switches. Additionally, the reference voltages Vr1, Vr2, . . . are also required in each parallel monitor circuit. Therefore, in the monitor voltage producing circuit disclosed in Japanese patent Publication Laid-Open No. 2005-287155, the number of components is increased to complicate the structure.

In view of the foregoing, an object of the invention is to provide a capacitor charging control circuit having a simple circuit configuration, in which the voltage divider circuit can be formed by the resistors having an equal resistance value.

SUMMARY OF THE INVENTION

In accordance with a first aspect of the invention, a capacitor charging control circuit includes plural bypass devices which are connected to plural series-connected capacitors to bypass currents respectively; plural bypass device control units which control currents passed through the bypass devices respectively; and a control voltage setting unit which can switch control voltages while inputting an identical control voltage to each of the plural bypass device control units, wherein the bypass device control unit charges each of the capacitors, the bypass device control unit keeps the bypass device in a cut-off state when a charging voltage of the capacitor is lower than a predetermined voltage value determined by the control voltage, and the bypass device control unit causes the capacitor to discharge through the bypass device to keep the charging voltage of the capacitor constant when the charging voltage of the capacitor exceeds the predetermined voltage value.

In accordance with the capacitor charging control circuit of the first aspect of the invention, the control voltage generated by the one control voltage setting unit can be inputted to the plural bypass device control units, so that the control voltage setting unit which generates the control voltages having plural levels can commonly be used among the plural bypass device control units to simplify the configuration of the capacitor charging control circuit. Additionally, because the control voltage is generated by the one control voltage setting unit, there is no risk of generating the variation in control voltage in each bypass device control unit unlike the case in which the control voltage setting units are provided in the plural bypass device control units respectively, and the operating accuracy of the capacitor charging control circuit can be improved.

In accordance with a second aspect of the invention, a capacitor charging control circuit includes plural bypass devices which are connected to plural series-connected capacitors to bypass currents respectively; plural bypass device control units which control currents passed through the bypass devices respectively; and a control voltage setting unit which can switch control voltages while inputting an identical control voltage to each of the plural bypass device control units, wherein the bypass device control unit charges each of the capacitors, and the bypass device control unit keeps the charging voltage of the capacitor constant by gradually increasing an amount of current discharged from the capacitor through the bypass device with increasing charging voltage of the capacitor when a charging voltage of the capacitor is located near a predetermined voltage value determined by the control voltage.

In accordance with the capacitor charging control circuit of the second aspect of the invention, the control voltage generated by the one control voltage setting unit can be inputted to the plural bypass device control units, so that the control voltage setting unit which generates the control voltages having plural levels can commonly be used among the plural bypass device control units to simplify the configuration of the capacitor charging control circuit. Additionally, because the control voltage is generated by the one control voltage setting unit, there is no risk of generating the variation in control voltage in each bypass device control unit unlike the case in which the control voltage setting units are provided in the plural bypass device control units respectively, and the operating accuracy of the capacitor charging control circuit can be improved. Additionally, because the analog operation (amplifying operation) is performed in the bypass device control unit, a ripple and the like are hardly generated in the charging voltage at the capacitor to stabilize the charging operation.

In the capacitor charging control circuit according to the first or second aspect of the invention, preferably the control voltage setting unit includes a voltage divider circuit which includes plural series-connected resistors having an identical resistance value; and a switching unit which switches the control voltages by changing voltage take-out positions from the voltage divider circuit, and the predetermined voltage values are changed at equal intervals by changing the control voltage with the voltage setting unit. Accordingly, because the predetermined voltage values are generated at equal intervals, the resistance values of the voltage divider circuits can be equalized. Therefore, widths and shapes of the resistors constituting the voltage divider circuits can be equalized to reduce the pair variation during the resistor production, and the operating accuracy can be improved in the capacitor charging control circuit.

In the capacitor charging control circuit according to the first or second aspect of the invention, preferably each of the bypass device control units include a voltage-to-current converter circuit which produces a current proportional to the control voltage of the control voltage setting unit; a current-to-voltage converter circuit which produces a voltage proportional to the current of the voltage-to-current converter circuit to output the predetermined voltage value; and a bypass device driving circuit which compares the predetermined voltage value and the charging voltage of the capacitor to control the bypass device.

In the capacitor charging control circuit according to another aspect of the invention, preferably the current-to-voltage converter circuit includes a trimming resistor to finely adjust the predetermined voltage value outputted from the current-to-voltage converter circuit. When the current-to-voltage converter circuit includes the trimming resistor, the predetermined voltage values at the bypass device control units can finely be adjusted by trimming the trimming resistor and the variation in predetermined voltage value can be reduced among the bypass device control units.

In the capacitor charging control circuit according to another aspect of the invention, preferably the voltage-to-current converter circuit is connected to one of electrodes of each corresponding capacitor. Accordingly, the voltage-to-current converter circuit is used as the current source to charge the capacitor.

In the invention, the unit which solves the problems has the features in which the components are appropriately combined, and various variations can be made by the combination of the components.

DETAILED DESCRIPTION OF THE PREFERRED EMBODIMENTS

First Embodiment

Figure 1:
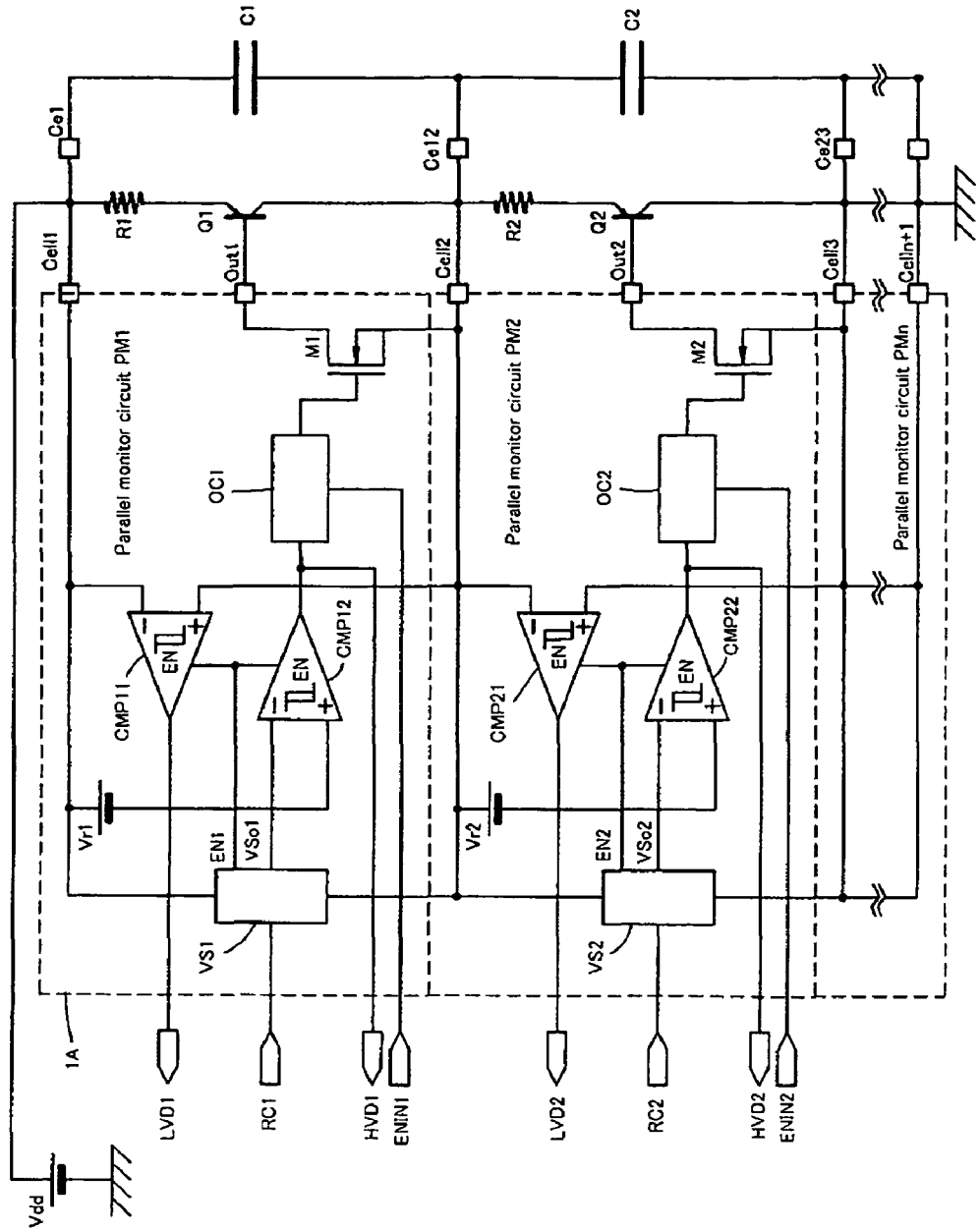
FIG. 1 is a conventional circuit diagram showing a monitor voltage producing circuit.
Figure 2:
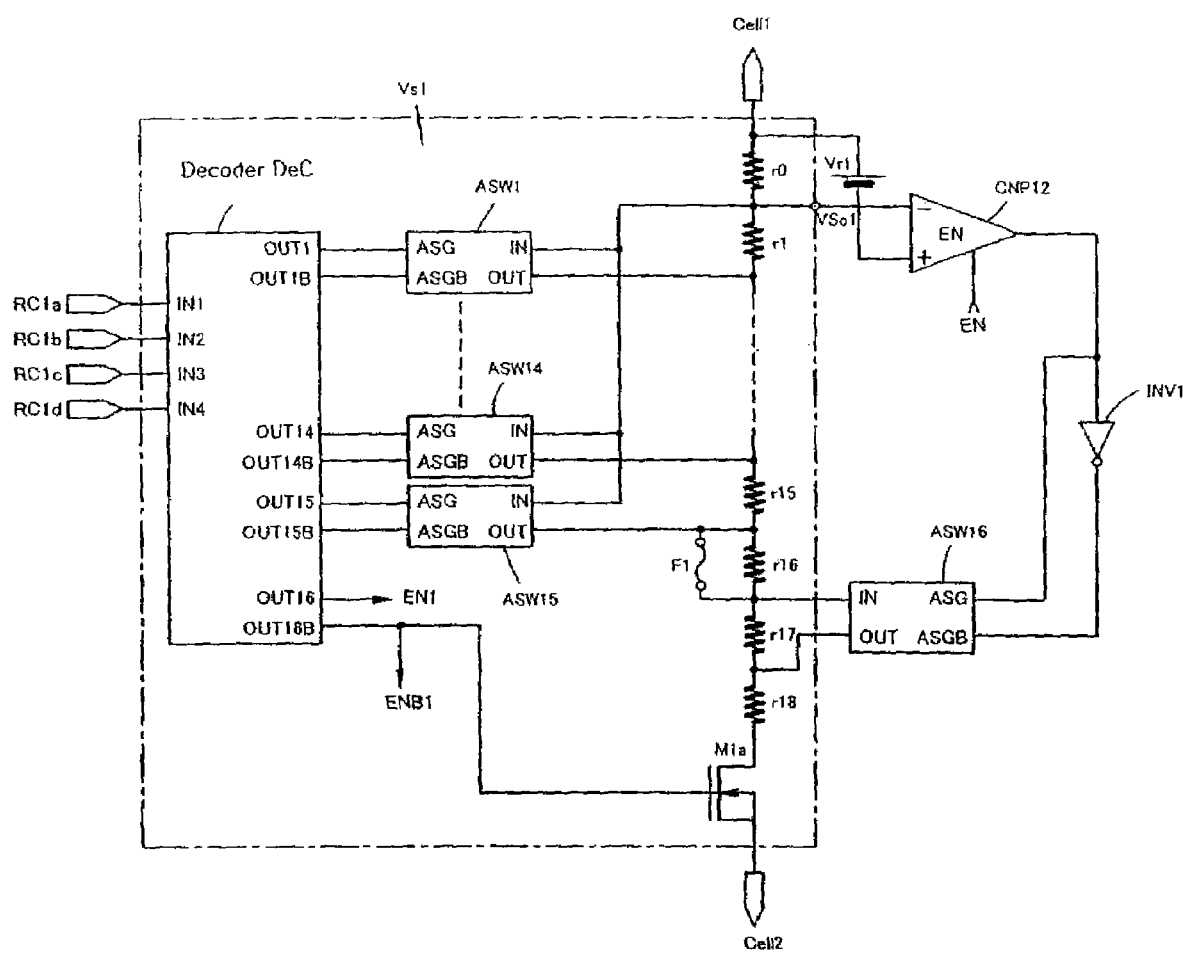
FIG. 2 is a circuit diagram showing a configuration of a voltage setting circuit used in the conventional monitor voltage producing circuit.
Figure 3:
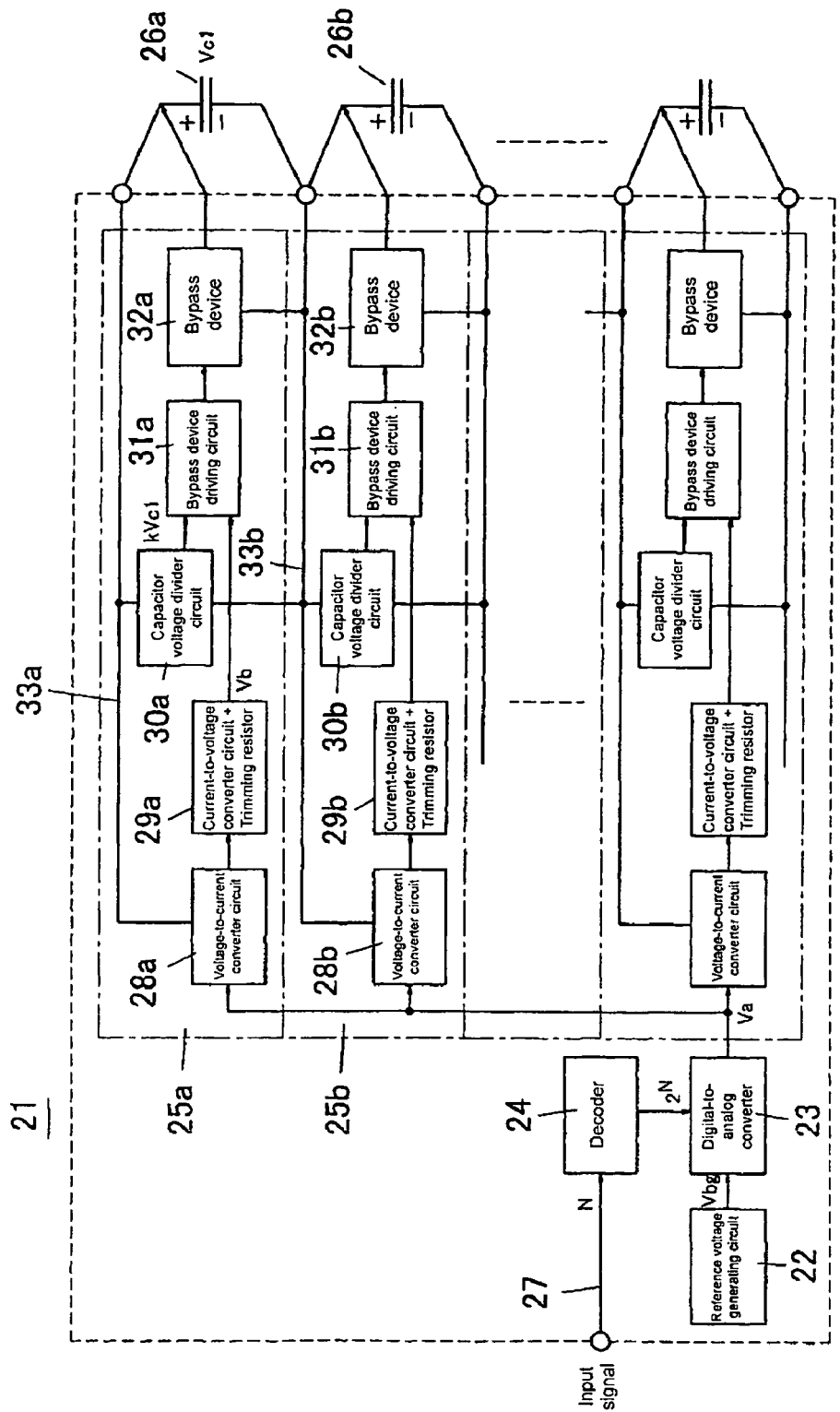
FIG. 3 is a block diagram showing a capacitor charging control circuit according to a first embodiment of the invention.

FIG. 3 is a block diagram showing a capacitor charging control circuit 21 according to a first embodiment of the invention. The capacitor charging control circuit 21 includes a reference voltage generating circuit 22, a digital-to-analog converter 23 (control voltage setting unit), a decoder 24, plural parallel monitor circuits 25a, 25b, . . . (bypass device control unit), and plural electrical double layer capacitors (hereinafter referred to as capacitor) 26a, 26b, . . . .

The reference voltage generating circuit 22 produces a predetermined direct-current reference voltage (band-gap reference voltage) Vbg and supplies the reference voltage Vbg to the digital-to-analog converter 23. The decoder 24 decodes an N-bit input signal (binary digital signal) 27 outputted from a control circuit (not shown) and outputs $2^N$ control signals to the digital-to-analog converter 23 to control the digital-to-analog converter 23. The digital-to-analog converter 23 outputs different voltages according to the control signals of the decoder 24. That is, the digital-to-analog converter 23 outputs control voltages Va having levels of the power of $2^N$ to the parallel monitor circuits 25a, 25b, . . . . The control voltages Va differ from one another by a constant voltage according to the values of the control signals from the decoder 24 (for example, voltages of 1.2V to 2.7V in 0.1V increment).

The electrical double layer capacitors 26a, 26b, . . . are made of an electrically conductive material having an extremely large surface area (for example, activated carbon), and energy density is enhanced at the expense of the slight increase of internal resistance.

The parallel monitor circuit 25a, 25b, . . . includes voltage-to-current converter circuits (constant current source) 28a, 28b, . . . , current-to-voltage converter circuits 29a, 29b, . . . , capacitor voltage divider circuits 30a, 30b, . . . , bypass device driving circuits 31a, 31b, . . . , and bypass devices 32a, 32b, . . . . Because the parallel monitor circuits 25a, 25b, . . . have the same configuration, only the parallel monitor circuit 25a will be described below.

The voltage-to-current converter circuit 28a converts the control voltage Va outputted from the digital-to-analog converter 23 into a current proportional to the control voltage Va. The voltage-to-current converter circuit 28a is connected to the capacitor 26a to constitute a constant current source which supplies the current to the capacitor 26a through a current supply line 33a.

The current-to-voltage converter circuit 29a produces a comparison voltage Vb by bringing the current converted by the voltage-to-current converter circuit 28a back to the voltage, and the current-to-voltage converter circuit 29a inputs the comparison voltage Vb to the bypass device driving circuit 31a. However, the comparison voltage Vb reproduced by the current-to-voltage converter circuit 29a is one which is based on a voltage between the capacitor 26a and the capacitor 26b cascade-connected thereto. The current-to-voltage converter circuit 29a has a trimming resistor, and the current-to-voltage converter circuit 29a can finely adjust the voltage value by trimming the trimming resistor.

Figure 4:
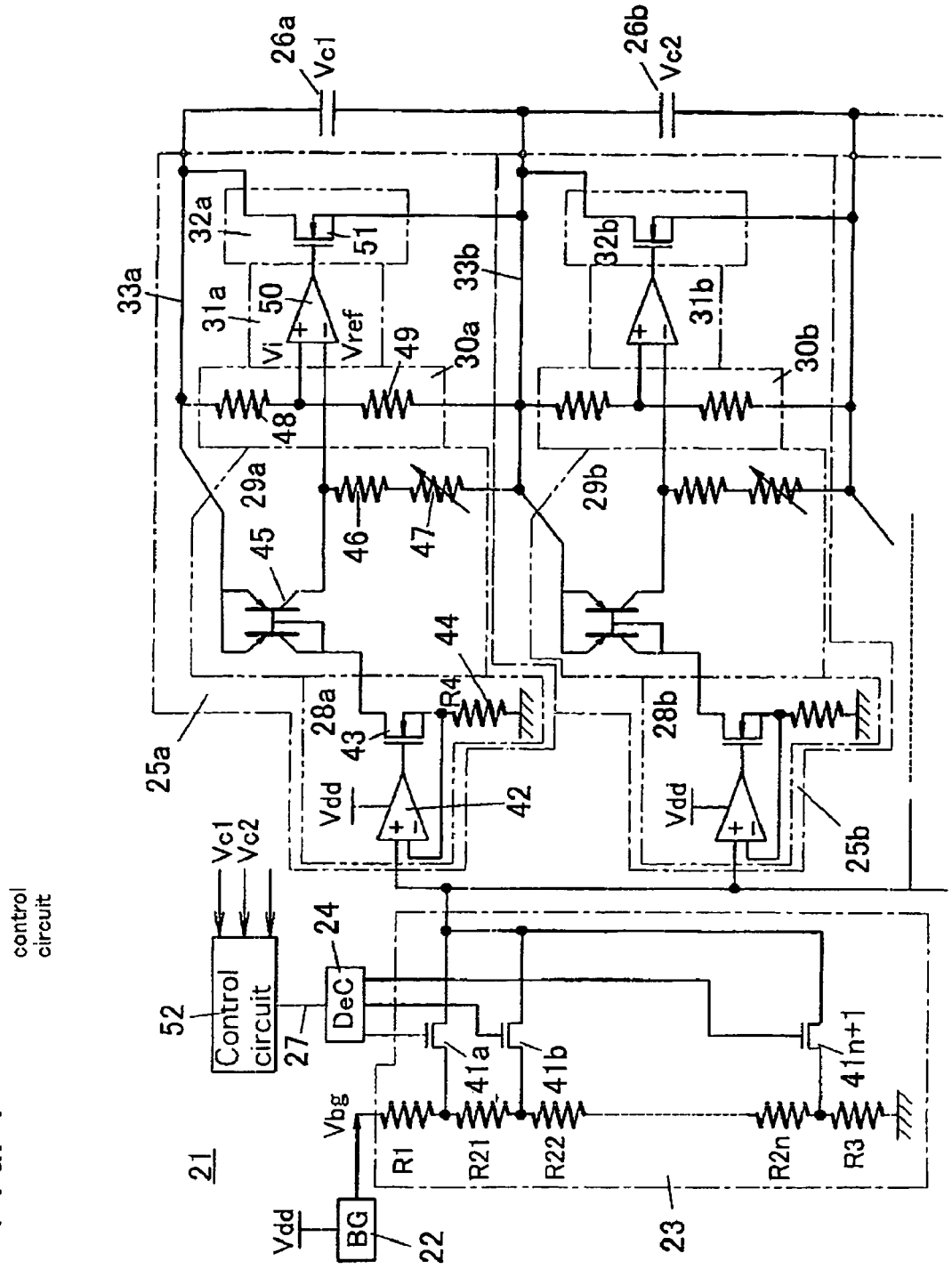
FIG. 4 is a circuit diagram specifically showing the capacitor charging control circuit of the first embodiment.

A voltage Vc1 between both ends of the capacitor 26a (voltage at an upper-side electrode based on a lower-side electrode of the capacitor 26a, Vc1<0 in the circuit of FIG. 4) is applied to the capacitor voltage divider circuit 30a, and the capacitor voltage divider circuit 30a inputs a detection voltage kVc1 obtained by dividing the capacitor voltage Vc1 to the bypass device driving circuit 31a.

The comparison signal Vb from the current-to-voltage converter circuit 29a and the detection voltage kVc1 from the capacitor voltage divider circuit 30a are inputted to the bypass device driving circuit 31a. The bypass device driving circuit 31 is turned off when the detection voltage |kVc1| is smaller than the comparison signal |Vb|, and the bypass device driving circuit 31 is turned on when the detection voltage |kVc1| is larger than the comparison signal |Vb|.

The bypass device 32a is connected both ends of the capacitor 26a. The bypass device 32a is in a cut-off state when the bypass device driving circuit 31a is turned off, and the bypass device 32a is brought into conduction to discharge the capacitor 26a when the bypass device driving circuit 31a is turned on.

Accordingly, in the parallel monitor circuit 25a, the bypass device 32a becomes the conduction state when the capacitor voltage Vc1 of the capacitor 26a reaches |Vb/k| when the charging of the capacitor 26a is started. As a result, the voltage Vc1 at the capacitor 26a is kept at the constant voltage (monitor voltage) Vc1/k by discharging the capacitor 26a. The comparison voltage Vb can be changed in a step manner by the input signal 27.

Because the parallel monitor circuits 25a, 25b, . . . perform the above-described operation, when the capacitor charging control circuit 21 sets the parallel monitor circuits 25a, 25b, . . . to the same monitor voltage using the input signal 27, one of the parallel monitor circuits 25a, 25b, . . . reaching the monitor voltage is kept at the monitor voltage. Therefore, the parallel monitor circuits 25a, 25b, . . . become the same capacitor voltage (monitor voltage). When the control circuit (not shown) detects that all the capacitors 26a, 26b, . . . reach the monitor voltage, the control circuit changes the input signal 27 to increase the monitor voltage by one step. The capacitors 26a, 26b, . . . are gradually boosted while uniformized at the monitor voltage, and the capacitors 26a, 26b, . . . are finally charged up to a fully charging voltage, so that the capacitors 26a, 26b, . . . are evenly charged while the variation is reduced in the fully charging state.

FIG. 4 is a circuit diagram specifically showing the capacitor charging control circuit 21 of the first embodiment. An electric power is supplied from a power supply Vdd to the reference voltage generating circuit 22, and the reference voltage generating circuit 22 outputs the constant reference voltage Vbg.

The digital-to-analog converter 23 includes plural series-connected resistors R1, R21, R22, . . . R2n, and R3 (n is an integer) and plural MOSs 41a, 41b, . . . , and 41n+1 whose back-gates are connected to the ground. In the series-connected resistors R1, R21, . . . , and R3, the reference voltage generating circuit 22 is connected to an upper end, the reference voltage Vbg is applied to the upper end, and a lower end is connected to the ground. Drains of MOSs 41a, 41b, . . . , and 41n+1 are connected to a midpoint of the resistors R1 and R21, a midpoint of the resistors R21 and R22, . . . , and a midpoint of the resistors R2n and R3 respectively. The other end of each of MOSs 41a, 41b, . . . , and 41n+1 is concentrated to an output end of the digital-to-analog converter 23, and each output (each bit) of the decoder 24 is connected to each gate of MOSs 41a, 41b, . . . , and 41n+1.

The N-bit input signal 27 is inputted from the control circuit 52, and the decoder 24 decodes the N-bit input signal 27 into the $2^N$-bit signal and outputs the $2^N$-bit signal. In the $2^N$-bit signal decoded by the decoder 24, one of the bits is 1 (high level) and other bits are 0 (low level).

Because the gates of MOSs 41a, 41b, . . . are connected to the bits of the signal decoded by the decoder 24 respectively, only one of MOSs 41a, 41b, . . . is turned on by the signal from the decoder 24, and other MOSs 41a, 41b, . . . are kept at the turn-off state. Therefore, the voltage at the point to which the drain of the turned-on MOS is connected is taken out to the output end of the digital-to-analog converter 23. Specifically, resistance values of the resistors R21, R22, . . . , and R2n are equal to one another (resistance values are also designated by the same symbols):

R21=R22=R23= . . . =R2n

When the turned-on MOSs 41a, 41b, . . . are switched, one of the control voltages Va which are different from one another by the constant voltage is taken out to the output end of the digital-to-analog converter 23.

Accordingly, assuming that Vbg is the reference voltage, Rtot=R1+R21+R22+ . . . +R2n+R3, and Rv is a combined resistance value of resistors between the ground and the midpoint of the resistors connected to the turned-on drain of MOS, the control voltage Va from the digital-to-analog converter 23 is expressed by the following formula:

$$Va=(Rv/Rtot)\times Vbg \qquad \text{(formula 1)}$$

For example, in the case where the control voltages Va of 1.2V to 2.7V in 0.1V increment are outputted from the output end of the digital-to-analog converter 23, the voltage of 2.7V at the midpoint of the resistors R1 and R21 is taken out when only MOS 41a is turned on, the voltage of 2.6V at the midpoint of the resistors R21 and R22 is taken out when only MOS 41b is turned on, the voltage of 1.3V at a midpoint of the resistors R2n−1 and R2n is taken out when only MOS 41n is turned on, and the voltage of 1.2V at the midpoint of the resistors R2n and R3 is taken out when only MOS 41n+1 is turned on.

The output end of the digital-to-analog converter 23 is divided into plural pieces, the same control voltage Va is inputted from the digital-to-analog converter 23 to each of the inputs of the parallel monitor circuits 25a, 25b, . . . . In the capacitors 26a, 26b, . . . , different-polarity electrodes are connected in series, and the output ends of the parallel monitor circuits 25a, 25b, . . . are connected to both ends of the capacitors 26a, 26b, . . . respectively. Because the parallel monitor circuits 25a, 25b, . . . have the same configuration, only the parallel monitor circuit 25a will be described below, and the same holds true for other parallel monitor circuits 25b, 25c, . . . .

As described above, the parallel monitor circuit 25a includes the voltage-to-current converter circuit 28a, the current-to-voltage converter circuit 29a, the capacitor voltage divider circuit 30a, the bypass device driving circuit 31a, and the bypass device 32a. The voltage-to-current converter circuit 28a includes a comparator 42, NMOS 43, and a resistor 44. An output of the comparator 42 is connected to a gate of NMOS 43, one end of the resistor 44 is connected to a source of NMOS 43, and the other end of the resistor 44 is connected to the ground. The source of NMOS 43 is also connected to an inverting input of the comparator 42, and negative feedback is given to the comparator 42. The control voltage Va of the digital-to-analog converter 23 is applied to a non-inverting input of the comparator 42, and a drain of NMOS 43 is connected to the current-to-voltage converter circuit 29a. Therefore, because the voltage at an upper end of the resistor 44 becomes Va, assuming that R4 is a resistance value of the resistor 44, a constant current I4=Va/R4 is passed through NMOS 43 and the resistor 44. The current value of the constant current I4 is expressed as follows using the formula 1:

$$I4=(Rv/Rtot)\times Vbg/R4 \qquad \text{(formula 2)}$$

Because the VI amplifier is used as each of the voltage-to-current converter circuits 28a, 28b, . . . output impedance of each of the voltage-to-current converter circuits 28a, 28b, . . . is decreased to eliminate output dependence, and the same current can be passed through the capacitors 26a, 26b, . . . . In order to decrease the number of components, the one voltage-to-current converter circuit can commonly be used among the parallel monitor circuits 25a, 25b . . . .

The current-to-voltage converter circuit 29a includes a current mirror circuit 45, a resistor 46, and a trimming resistor 47. Because the collector of one of PNP transistors constituting the current mirror circuit 45 is connected to the drain of NMOS 43 of the voltage-to-current converter circuit 28, the current I4 is passed through the two PNP transistors constituting the current mirror circuit 45. The collector of the other PNP transistor constituting the current mirror circuit 45 is connected to an inverting input of a comparator 50 of the bypass device driving circuit 31a, and the resistor 46 and the trimming resistor 47 are inserted between the inverting input and the current supply line 33b while connected in series. Therefore, assuming that R5 is a resistance value of the resistor 46 and Rtrim is a resistance value of the trimming resistor 47, the voltage I4×(R5+Rtrim) is inputted as a comparison voltage Vref to the inverting input of the comparator 50 from the current-to-voltage converter circuit 29a. The comparison voltage Vref is expressed as follows using the formula 2:

$$Vref=Vbg\times(Rv/Rtot)(R5+Rtrim)/R4 \qquad \text{(formula 3)}$$

The resistance value Rtrim is finely adjusted by laser trimming of the trimming resistor 47, which allows the comparison voltage Vref to be adjusted. Therefore, offset can be canceled in each of the parallel monitor circuits 25a, 25b, . . . .

Emitters of the two transistors constituting the current mirror circuit 45 are connected to the capacitor 26a through a current supply line 33a, so that the capacitor 26a can be charged from the constant current source (voltage-to-current converter circuit 28a) through the current-to-voltage converter circuit 29a.

The capacitor voltage divider circuit 30a includes series-connected resistors 48 and 49. The capacitor voltage divider circuit 30 is connected both ends of the capacitor 26 to be parallel to the capacitor 26, and a midpoint of the resistors 48 and 49 is connected to the non-inverting input of the comparator 50 of the bypass device driving circuit 31a. Accordingly, Vc1 is the voltage between both ends of the capacitor 26a, R7 is a resistance value of the resistor 48, and R8 is a resistance value of the resistor 49, a detection voltage Vi at the midpoint of the resistors 48 and 49 is expressed by the following formula:

$$Vi=Vc1\times R8/(R7+R8) \qquad \text{(formula 4)}$$

The detection voltage Vi is inputted to the non-inverting input of the comparator 50.

The bypass device driving circuit 31a includes the one comparator 50 (amplifier may be used). The comparison voltage Vref expressed by the formula 3 is inputted to the inverting input terminal of the comparator 50, and the detection voltage Vi expressed by the formula 4 is inputted to the non-inverting input. NMOS 51 is used as the bypass device 32a, NMOS 51 is connected to both ends of the capacitor 26a so as to be parallel to the capacitor 26a. NMOS 51 is turned on to bring the source and the drain into conduction when the output of the comparator 50 becomes a high level, and NMOS 51 is turned off to cut off the source and the drain when the output of the comparator 50 becomes a low level.

Accordingly, in the parallel monitor circuit 25a, when the detection voltage Vi is lower than the comparison voltage Vref, because the output of the comparator 50 becomes the low level to keep NMOS 51 in the off-state, the capacitor 26 is charged from the voltage-to-current converter circuit 28a. When the capacitor 26a is charged to cause the detection voltage Vi to reach the comparison voltage Vref, the output of the comparator 50 becomes the high level to turn on NMOS 51, and the capacitor 26a discharges through NMOS 51 (bypass device 32a) to maintain the charging voltage at the capacitor 26a.

In other words, referring to formulas 3 and 4, when the charging voltage Vc1 of the capacitor 26a reaches the voltage expressed by the formula 5, $$Vm = Vbg(Rv/Rtot)(R5 + Rtrim)(R7 + R8)/(R4 \times R8) \quad \text{(formula 5)}$$
$$= Va(R5 + Rtrim)(R7 + R8)/(R4 \times R8)$$

the bypass device 32a is turned on to start the discharge of the capacitor 26a, and the charging voltage Vc1 of the capacitor 26a is kept at Vm.

A ratio of the monitor voltage Vm and the control voltage Va can arbitrarily determined by each resistance value, and desirably the ratio is determined such that the control voltage Va becomes Va=Vm/3 for the monitor voltage Vm of each stage determined if needed.

The control circuit 52 monitors the capacitor voltages Vc1, Vc2, . . . of the capacitors 26a, 26b, . . . while outputting the input signal 27 to the decoder 24. In starting the charging, the control circuit 52 output the input signal 27 to turn on only MOS 41n+1 such that the monitor voltage becomes the smallest Vm1. When MOS 41n+1 is turned on, the capacitors 26a, 26b, . . . start the charging, and the capacitor which reaches the monitor voltage Vm1 discharges to maintain the charging voltage at Vm1.

When the control circuit 52 detects that all the charging voltages Vc1, Vc2, . . . of the capacitors 26a, 26b, . . . reach the monitor voltage Vm1, the control circuit 52 changes the input signal 27 to turn on only MOS 41n, and the control circuit 52 sets the monitor voltage to Vm2 which is larger than the monitor voltage Vm1 by one step. Thus, in the capacitor charging control circuit 21, while the charging voltages Vc1, Vc2, . . . of the capacitors 26a, 26b, . . . are uniformized, the capacitors 26a, 26b, . . . are charged up to the fully charging voltage such that the charging voltages Vc1, Vc2, . . . sequentially become the monitor voltage Vm1→Vm2→Vm3→ . . . . Therefore, the capacitors 26a, 26b, . . . can evenly charged.

In the capacitor charging control circuit 21 of the first embodiment, the voltage divider resistors R1, R21, . . . , and R3 (monitor voltage setting unit) are provided in the forestage of the parallel monitor circuits 25a, 25b, . . . to switch the monitor voltage. Therefore, the monitor voltage setting unit can commonly be used among the parallel monitor circuits 25a, 25b, . . . , and the labor hour for producing the resistor can be reduced and simplified.

The switching unit for taking out each voltage value from the voltage divider resistor is not required in each parallel monitor circuit. Because NMOS is used, the number of switching unit can be decreased as a whole, and the number of components can be decreased to simplify the structure.

As can be seen from the formula 5, when the monitor voltages are changed at equal intervals, the voltage divider resistors R21, R22, . . . , and R2n become the equal resistance value. Therefore, shapes, widths, and lengths of the voltage divider resistors R21 to R2n can identically be formed to enhance relative pair accuracy of the resistors, and the resistance values of the resistors can be uniformized to obtain the accurate monitor voltage.

In the capacitor charging control circuit 21, because the VI amplifier having no voltage dependence is used as the voltage-to-current converter circuit 28, the current inputted to the current mirror circuit 45 becomes identical in the parallel monitor circuits 25a, 25b, . . . , and the voltage dependence of the comparison voltage Vref becomes equal in each of the parallel monitor circuits 25a, 25b, . . . . Because the resistor 44 and the resistor 46 can be formed by the same resistor (type and width), a variation in mirror ratio of the current mirror circuit 45 becomes dominant in the factor of the variation in comparison voltage Vref. In the case where the current mirror circuit 45 is formed by a PNP mirror circuit, the variation in mirror ratio mainly caused by hfe and Vce voltage dependence. However, hfe has a little influence because the collector current change caused by the variation in hfe becomes 1/hfe. The 1:1 comparison voltage Vref can be produced for each output voltage of the digital-to-analog converter 23. Accordingly, in the present invention, because the voltage-to-current conversion and the current-to-voltage conversion are used in the comparison voltage Vref, the voltage dependence is eliminated in each of the parallel monitor circuits 25a, 25b, . . . , and the capacitor voltage can be obtained with the small variation.

Figure 5:
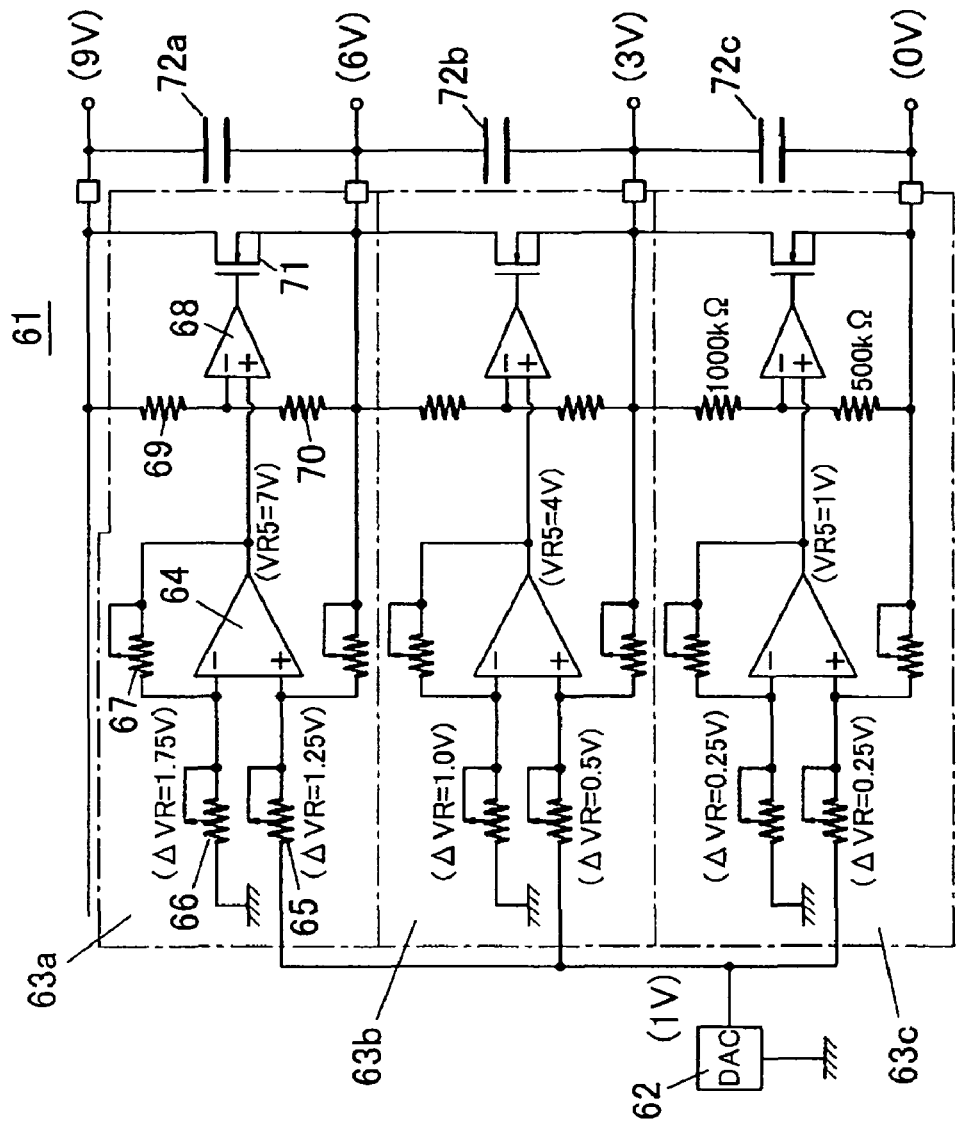
FIG. 5 is a circuit diagram showing a capacitor charging control circuit in which a differential amplifier is used.

A differential amplifier shown in FIG. 5 may be used as the capacitor charging control circuit which charges the plural series-connected capacitors. In a capacitor charging control circuit 61 of FIG. 5, the output of a digital-to-analog converter 62 whose output voltage becomes variable is branched and connected to parallel monitor circuits 63a, 63b, and 63c. The parallel monitor circuits 63a, 63b, and 63c have the same configuration, and capacitors 72a, 72b, and 72c are connected between the outputs of the parallel monitor circuits 63a, 63b, and 63c respectively.

Each of the parallel monitor circuits 63a, 63b, and 63c includes a differential amplifier 64 having a negative feedback resistor 67 in an input stage and the output of the digital-to-analog converter 62 is connected to a non-inverting input terminal of the differential amplifier 64 through the diffused resistor 65. An inverting input terminal of the differential amplifier 64 is connected to the ground through a diffused resistor 66.

The output of the differential amplifier 64 is connected to a non-inverting input terminal of a comparator 68 which is of the bypass device driving circuit. In the parallel monitor circuits 63a, 63b, and 63c, the voltage between both ends of each of the capacitors 72a, 72b, and 72c is divided by voltage divider resistors 69 and 70, and divided voltage is connected to an inverting input terminal of the comparator 68.

NMOS 71 which is of the bypass device is connected to both ends of each of the capacitors 72a, 72b, and 72c so as to be parallel to each of the capacitors 72a, 72b, and 72c. The output of the comparator 68 is connected to the gate of NMOS 71.

The output sides of the parallel monitor circuits 63a, 63b, and 63c have the same configuration as the parallel monitor circuits 25a, 25b, . . . of the first embodiment shown in FIG. 4. However, the parallel monitor circuits 63a, 63b, and 63c differ from the parallel monitor circuits 25a, 25b, . . . in that the differential amplifier 64 is used in the output stage.

Even in the capacitor charging control circuit 61, the output voltage of the digital-to-analog converter 62 is increased in a step manner, which allows the charging voltages of the capacitors 72a, 72b, and 72c to be increased in the step manner while the charging voltages are uniformized.

Figure 6:
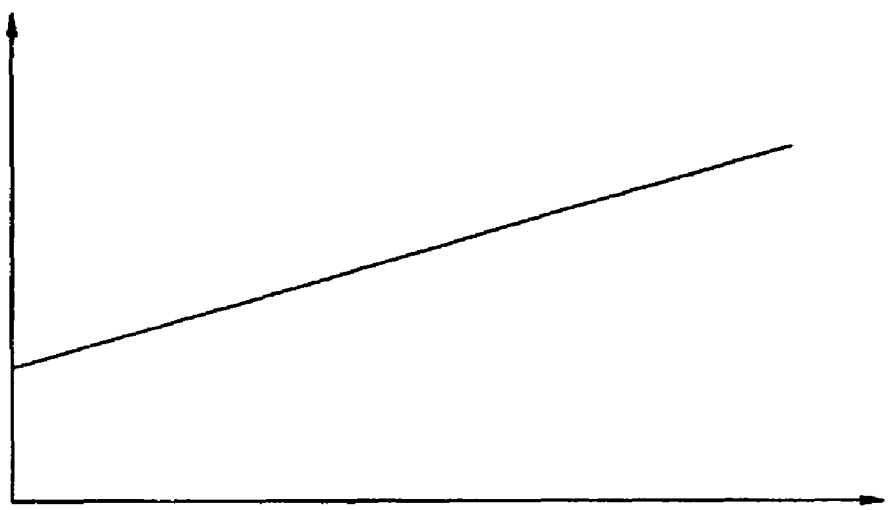
FIG. 6 is a schematic view explaining bias dependence of a resistance value of a diffused resistor.

However, in the capacitor charging control circuit 61 in which the differential amplifier is used, due to bias dependence of the resistance value of diffused resistors 65 and 66, unfortunately an output voltage VR5 of the differential amplifier 64 varies, whereby the charging voltage also varies in each of the capacitors 72a, 72b, and 72c. The bias dependence of the resistance value of the diffused resistor is a phenomenon in which, assuming that VH and VL (however, VH>VL) are voltages at both ends of the diffused resistor, a resistance value R of the diffused resistor is changed by a bias voltage $\Delta VR=(VH-VL)/2$ as shown in FIG. 6.

For example, as shown in FIG. 5, the resistance value of the voltage divider resistor 69 is set to 1000 kΩ, the resistance value of the voltage divider resistor 70 is set to 500 kΩ, and the output voltage of the digital-to-analog converter 62 is set to 1V. At this point, it is assumed that the voltage between both ends of each of the capacitors 72a, 72b, and 72c becomes 3V. The midpoint voltages divided by the voltage divider resistors 69 and 70 (inverting input terminal voltage of the comparator 68) become 7V, 4V, and 1V in the parallel monitor circuits 63a, 63b, and 63c respectively, so that the output voltages VR5 of the comparators 68 of the parallel monitor circuits 63a, 63b, and 63c become 7V, 4V, and 1V respectively. Assuming that the differential amplifier 64 has an amplification factor of 2 in each of the parallel monitor circuits 63a, 63b, and 63c, both the inverting input terminal voltage and the non-inverting input terminal voltage of the comparator 68 of the parallel monitor circuit 63a become 3.5V, both the inverting input terminal voltage and the non-inverting input terminal voltage of the comparator 68 of the parallel monitor circuit 63b become 2V, and both the inverting input terminal voltage and the non-inverting input terminal voltage of the comparator 68 of the parallel monitor circuit 63c become 0.5V.

Accordingly, in the parallel monitor circuit 63a, the bias voltage $\Delta VR$ of the diffused resistor 66 becomes $\Delta VR=3.5V/2=1.75V$, and the bias voltage $\Delta VR$ of the diffused resistor 65 becomes $\Delta VR=(3.5V-1V)/2=1.25V$. In the parallel monitor circuit 63b, the bias voltage $\Delta VR$ of the diffused resistor 66 becomes $\Delta VR=2V/2=1V$, and the bias voltage $\Delta VR$ of the diffused resistor 65 becomes $\Delta VR=(2V-1V)/2=0.5V$. Therefore, in both the parallel monitor circuit 63a and the parallel monitor circuit 63b, even if the diffused resistor 65 and the diffused resistor 66 are formed so as to have the equal resistance value, the diffused resistors 65 and 66 differs from each other in the resistance value because of the different bias voltages $\Delta VR$, the output voltage VR5 of the comparator 68 fluctuates, whereby the charging voltage of the capacitor also fluctuates. In the case where the charging voltages of the capacitors 72a, 72b, and 72c are incremented, because the increase in input voltage from the digital-to-analog converter 62 causes the bias voltage at the diffused resistors 65 and 66 to further fluctuate, the output voltage of each differential amplifier 64 cannot accurately be produced. Particularly, the problem becomes remarkable when the number of cells of the capacitor is increased to increase the charging voltage.

On the contrary, the problem is not generated in the capacitor charging control circuit 21 of the present invention.

Second Embodiment

A capacitor charging control circuit according to a second embodiment of the invention will be described below. Because the capacitor charging control circuit of the second embodiment has a configuration similar to that of the capacitor charging control circuit 21 of the first embodiment, the drawing is omitted, and only a portion different from that of the first embodiment is described. In the first embodiment, the comparator 50 is used as the bypass device driving circuit 31a, 31b, . . . . On the other hand, in the second embodiment, an operational amplifier in which the analog operation is performed is used as the bypass device driving circuit 31a, 31b, . . . . When the detection voltage Vi is brought close to the comparison voltage Vref, or when the detection voltage Vi exceeds the comparison voltage Vref, the output current of the operational amplifier is gradually increased to increase the discharge current passed through each of the bypass devices 32a, 32b, . . . . Then, the charging voltage at the capacitor is stabilized when the charging voltage is equal to a predetermined monitor voltage.

Thus, because the discharge current passed through each of the bypass devices 32a, 32b, . . . is smoothly changed, the ripple is not generated in the charging voltage at the capacitor, and the capacitor charging control circuit is stably operated.

What is claimed is:

1. The capacitor charging control circuit,
a plurality of bypass devices which are connected to a plurality of series-connected capacitors to bypass currents respectively;
a plurality of bypass device control units which control currents passed through the bypass devices respectively; and
a control voltage setting unit which can switch control voltages while inputting an identical control voltage to each of the plurality of bypass device control units,
wherein the bypass device control unit charges each of the capacitors, the bypass device control unit keeps the bypass device in a cut-off state when a charging voltage of the capacitor is lower than a predetermined voltage value determined by the control voltage, and the bypass device control unit causes the capacitor to discharge through the bypass device to keep the charging voltage of the capacitor constant when the charging voltage of the capacitor exceeds the predetermined voltage value, and
wherein the control voltage setting unit includes:
a voltage divider circuit which includes a plurality of series-connected resistors having an identical resistance value; and
a switching unit which switches the control voltages by changing voltage take-out positions from the voltage divider circuit, and
the predetermined voltage values are changed at equal intervals by changing the control voltage with the voltage setting unit.

2. The capacitor charging control circuit,
a plurality of bypass devices which are connected to a plurality of series-connected capacitors to bypass currents respectively;
a plurality of bypass device control units which control currents passed through the bypass devices respectively; and
a control voltage setting unit which can switch control voltages while inputting an identical control voltage to each of the plurality of bypass device control units,
wherein the bypass device control unit charges each of the capacitors, the bypass device control unit keeps the bypass device in a cut-off state when a charging voltage of the capacitor is lower than a predetermined voltage value determined by the control voltage, and the bypass device control unit causes the capacitor to discharge through the bypass device to keep the charging voltage of the capacitor constant when the charging voltage of the capacitor exceeds the predetermined voltage value, and
wherein each of the bypass device control units includes:
a voltage-to-current converter circuit which produces a current proportional to the control voltage of the control voltage setting unit;
a current-to-voltage converter circuit which produces a voltage proportional to the current of the voltage-to-current converter circuit to output the predetermined voltage value; and a bypass device driving circuit which compares the predetermined voltage value and the charging voltage of the capacitor to control the bypass device.

3. The capacitor charging control circuit according to claim 2, wherein the current-to-voltage converter circuit includes a trimming resistor to finely adjust the predetermined voltage value outputted from the current-to-voltage converter circuit.

4. The capacitor charging control circuit according to claim 2, wherein the voltage-to-current converter circuit is connected to one of electrodes of each corresponding capacitor.

5. The capacitor charging control circuit,
- a plurality of bypass devices which are connected to a plurality of series-connected capacitors to bypass currents respectively;
- a plurality of bypass device control units which control currents passed through the bypass devices respectively; and
- a control voltage setting unit which can switch control voltages while inputting an identical control voltage to each of the plurality of bypass device control units,
- wherein the bypass device control unit charges each of the capacitors, and the bypass device control unit keeps the charging voltage of the capacitor constant by gradually increasing an amount of current discharged from the capacitor through the bypass device with increasing charging voltage of the capacitor when a charging voltage of the capacitor is located near a predetermined voltage value determined by the control voltage, and
- wherein the control voltage setting unit includes:
- a voltage divider circuit which includes a plurality of series-connected resistors having an identical resistance value; and
- a switching unit which switches the control voltages by changing voltage take-out positions from the voltage divider circuit, and
- the predetermined voltage values are changed at equal intervals by changing the control voltage with the voltage setting unit.

6. The capacitor charging control circuit,
- a plurality of bypass devices which are connected to a plurality of series-connected capacitors to bypass currents respectively;
- a plurality of bypass device control units which control currents passed through the bypass devices respectively; and
- a control voltage setting unit which can switch control voltages while inputting an identical control voltage to each of the plurality of bypass device control units,
- wherein the bypass device control unit charges each of the capacitors, and the bypass device control unit keeps the charging voltage of the capacitor constant by gradually increasing an amount of current discharged from the capacitor through the bypass device with increasing charging voltage of the capacitor when a charging voltage of the capacitor is located near a predetermined voltage value determined by the control voltage, and
- wherein each of the bypass device control units includes:
- a voltage-to-current converter circuit which produces a current proportional to the control voltage of the control voltage setting unit;
- a current-to-voltage converter circuit which produces a voltage proportional to the current of the voltage-to-current converter circuit to output the predetermined voltage value; and
- a bypass device driving circuit which compares the predetermined voltage value and the charging voltage of the capacitor to control the bypass device.

7. The capacitor charging control circuit according to claim 6, wherein the current-to-voltage converter circuit includes a trimming resistor to finely adjust the predetermined voltage value outputted from the current-to-voltage converter circuit.

8. The capacitor charging control circuit according to claim 6, wherein the voltage-to-current converter circuit is connected to one of electrodes of each corresponding capacitor.

* * * * *